United States Patent [19]

Osborn

[11] 4,304,112
[45] Dec. 8, 1981

[54] TRANSMISSION SHIFTER WITH PARK LOCK

[75] Inventor: Charles Osborn, Spring Lake, Mich.

[73] Assignee: JSJ Corporation, Grand Haven, Mich.

[21] Appl. No.: 103,622

[22] Filed: Dec. 14, 1979

[51] Int. Cl.³ .................... B60R 25/06; E05B 65/12; G05G 5/08
[52] U.S. Cl. ........................ 70/247; 70/254; 70/257; 74/475; 74/526; 74/535; 74/538
[58] Field of Search .............. 70/193, 194, 195, 237, 70/239, 247, 248, 254, 257; 74/535, 538, 475, 526, 527, 878

[56] References Cited

U.S. PATENT DOCUMENTS

| | | | |
|---|---|---|---|
| 868,907 | 10/1907 | Coltman | 70/194 |
| 1,262,200 | 4/1918 | Jensen | 70/193 |
| 1,303,800 | 5/1919 | Jennings | 70/195 |
| 1,800,678 | 4/1931 | Craig | 70/194 X |
| 1,818,997 | 8/1931 | Martel | 70/257 X |
| 2,156,355 | 5/1939 | Sandberg | 70/193 |
| 3,465,559 | 9/1969 | Rhodes et al. | 70/248 |
| 3,998,109 | 12/1976 | O'Brien | 74/473 R |
| 4,138,905 | 2/1979 | Konishi | 74/535 X |
| 4,232,511 | 11/1980 | Kimberlin | 74/538 X |
| 4,235,123 | 11/1980 | Simancik et al. | 74/475 |

*Primary Examiner*—Allan D. Herrmann
*Attorney, Agent, or Firm*—Price, Heneveld, Huizenga & Cooper

[57] ABSTRACT

An automotive transmission shifter and park lock is disclosed which includes a base for mounting the shifter in an automotive vehicle. A shift lever is pivotable with respect to the base and a park lock hook is pivotally mounted on the shift lever. The base includes means for engaging the park lock hook comprising an aperture disposed in the base. The park lock hook is normally spring biased upwardly out of engagement with the aperture disposed on the base. Means for connecting the lock hook to an ignition switch locked park lock cable is provided whereby once the park lock cable is locked stationary by the ignition switch, the park lock hook is automatically pivoted into engagement with the aperture in the base upon an attempt to pivot the shift lever out of the park position. This hook-type lockout of the present invention generates the principal lockout forces in the shifter itself and the shifter and hook are sufficiently sturdy to prevent distortion and insure that the vehicle transmission cannot be moved from the park position once the ignition is turned off.

36 Claims, 3 Drawing Figures

TRANSMISSION SHIFTER WITH PARK LOCK

BACKGROUND OF THE INVENTION

The present invention relates generally to automotive transmission shifters and more particularly, to an automotive transmission shifter park lock.

Automotive transmission shifter park locks are known in the prior art. Transmission park locks are devices which disable the transmission shifter once the ignition switch or key is turned to the off position. These devices are intended to prevent the transmission from inadvertently being placed in the neutral position or in gear, for example, by the tampering of a child. Park locks are most often found in vehicles having automatic transmissions.

In the typical prior art automotive automatic transmission park lock, the ignition switch is provided with locking linkage that is interconnected with the transmission shifter by a flexible shielded park lock cable. Flexible shielded cables of this type are known in the art as Bowden cables. The park lock cable is generally connected to the pivotable manually actuated shift lever and is normally displaceable therewith. The ignition switch locking linkage insures that if the transmission is in any position other than the park position, the ignition key cannot be removed from the switch. Most importantly, the ignition switch lock linkage locks the park lock cable in place once the ignition switch is turned off. Since the park lock cable is no longer free to translate with the pivotable shift lever when the ignition is off, the transmission shifter is locked in the park position. In the case of a conventional automotive automatic transmission the vehicle will not roll with the transmission in park and the park lock insures that the automotive transmission cannot accidentally be placed in gear or in the neutral position once the ignition is turned off.

Problems with this type of prior art park lock are related to the fact that all of the park locking forces are generated in the ignition switch linkage. Thus, to transmit these forces to the transmission shifter, a relatively sturdy and expensive park lock cable is required. Furthermore, the ignition switch locking linkage and the park lock cable must be sturdy enough and must be assembled with sufficiently rigorous tolerences to insure that the cable and lock linkage cannot distort and stretch an amount sufficient to allow the transmission to be accidentally placed in gear. Also, since the locking forces are generated in the ignition lock linkage and transmitted via the park lock cable, slack inevitably develops in the linkage and park lock cable from the normal wear of these elements, making it easier to overcome the park lock and creating a potentially dangerous situation.

SUMMARY OF THE INVENTION

According to the present invention these and other problems in the prior art are solved by provision of an automotive transmission shifter and park lock which generates the principal park locking forces in the transmission shifter. More specifically, the shifter and park lock comprises a base adapted for mounting in an automotive vehicle. A transmission shift lever is pivotally mounted on the base. A park lock hook is pivotally mounted on the transmission shift lever. The base includes means for engaging the lock hook and thus preventing pivoting of the shift lever out of the park position. The park lock hook is normally spring biased upwardly away from the engaging means to allow pivoting of the transmission shift lever during the normal operation of the vehicle. However, once the transmission is placed in the park position and the ignition is turned off, locking the park lock cable stationary, means for connecting the lock hook to the park lock cable is provided whereby pivoting of the shift lever out of the park position automatically pivots the hook downwardly into contact with the engaging means effectively preventing removal of the transmission shifter from the park position.

Since the principal park lock forces are generated by engagement between the park lock hook and the base of the shifter, the problems heretofore encountered with park locks which generated locking forces at the ignition switch are eliminated. The only loading on the lock linkage disposed at the ignition switch and park lock cable interconnecting the shifter and the ignition switch is the loading created by the spring biasing means which normally pivots the hook upward out of engagement with the base of the shifter. The strength of this spring biasing means need only be sufficient to overcome frictional and inertial forces generated in the lock linkage and the park lock cable during normal shifting operation. These forces are of course much less than the park locking forces necessary to prevent inadvertent removal of the transmission shift lever from the park position. Thus, wear and stretching of these components becomes less of a problem and smaller, lighter, cheaper components may be substituted for the components presently used in ignition switch actuated park lock arrangements. Furthermore, it is a relatively easy matter to construct a park lock hook and shifter base with sufficient sturdyness to prevent distortion or stretching that would allow the vehicle to be removed from the park position and thus a stronger, more positive park lock is provided.

DESCRIPTION OF THE PREFERRED EMBODIMENTS

Figure 2:
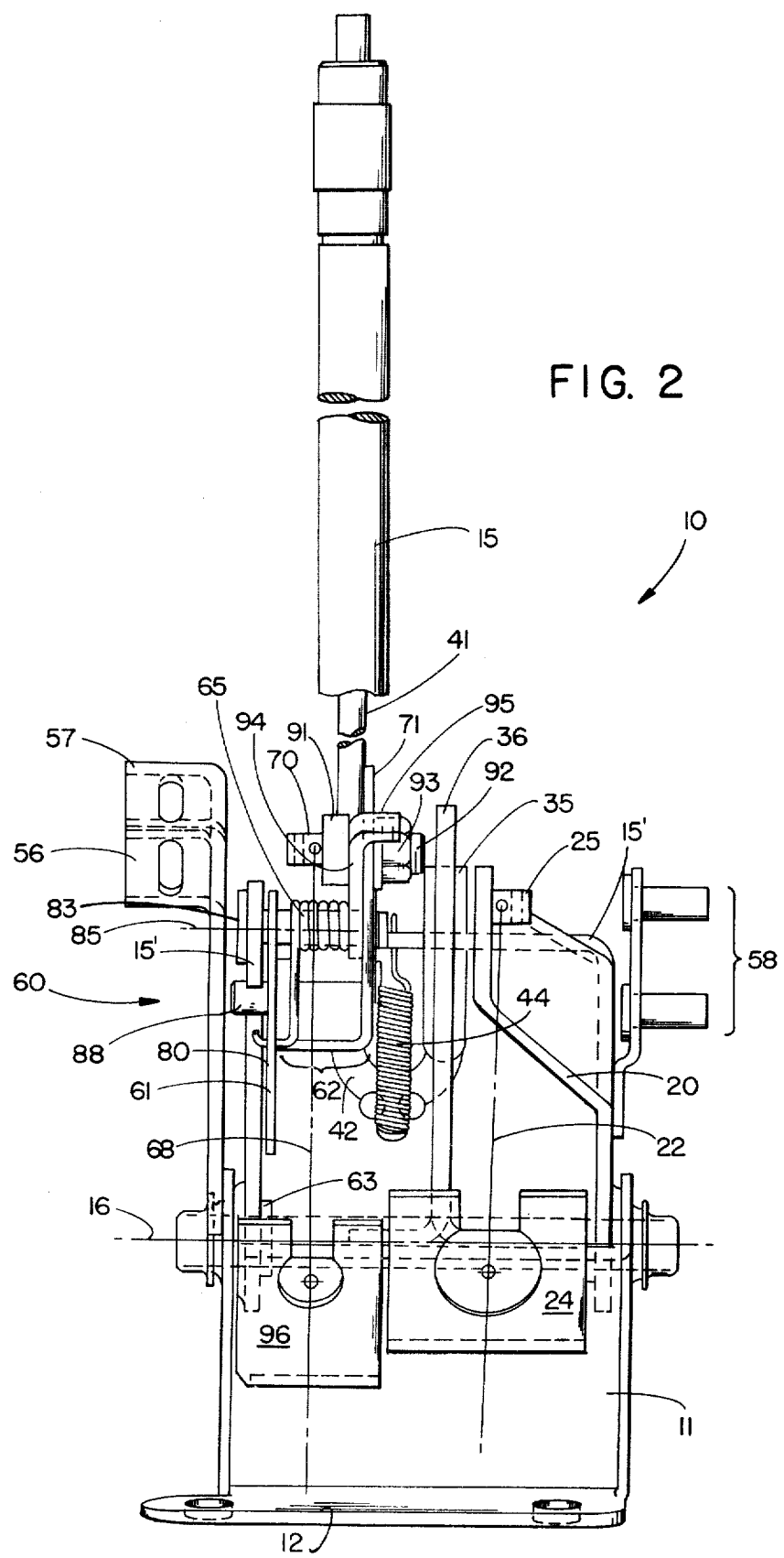
FIG. 2 is a front elevational view of a transmission shifter and park lock constructed according to the present invention.
Figure 3:
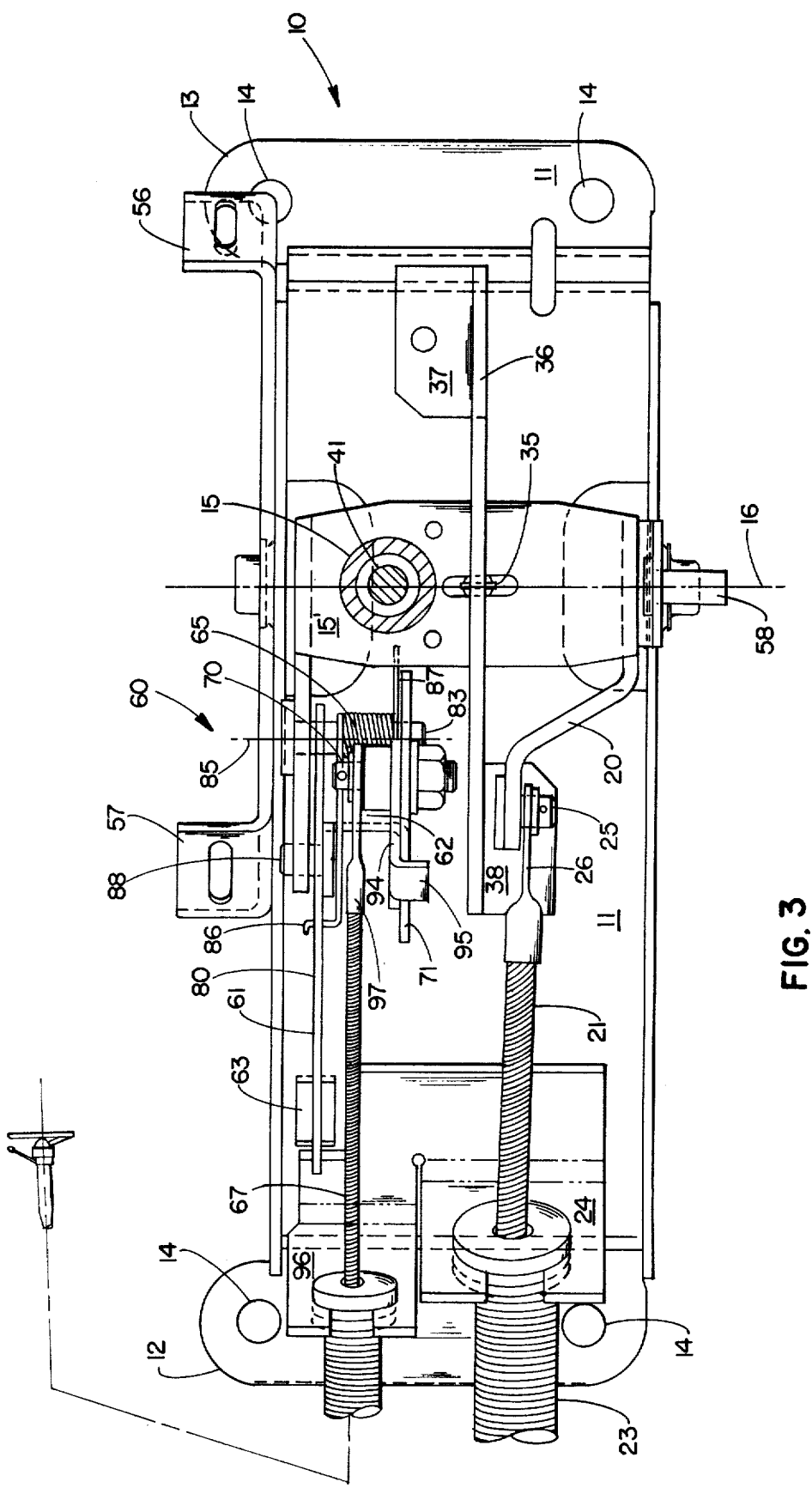
FIG. 3 is a plan view, partially in section, of an automotive transmission shifter and park lock constructed according to the present invention.

Referring to the Figures an automotive transmission shifter is illustrated at 10. In this case the automotive transmission shifter 10 is an automatic transmission shifter. However, it should be understood that the park lock of the present invention may have utility in other types of automotive transmission shifters. For example, it may be desirable to use the park lock of the present invention to lock a vehicle having a manual transmission in first gear when the ignition is turned off. The shifter 10 comprises a base 11 adapted for mounting in an automotive vehicle. The base 11 includes flanges 12 and 13 having a plurality of apertures 14 therein for bolting or otherwise suitably mounting the base 11 to the floor pan of an automotive vehicle. A shift lever 15 is translatably mounted on the base 11. More particularly, in this case the shift lever 15 is welded or otherwise suitably secured to a shift lever carrier 15' which is pivotally mounted on the base 11 about axis 16. The shift lever carrier 15' is to be considered a portion of the shift lever 15 and hereinafter only the shift lever 15 will be referred to. The shift lever 15 includes means for connecting the shift lever 15 to a transmission shift cable 21 comprising a cable shifting arm 20. The shift cable illustrated at 21 in FIG. 3 is normally disposed along the axis 22 illustrated in FIGS. 1 and 2. The shift cable 21 is a flexible shielded cable of the type known in the art as a Bowden cable. The outer shield portion 23 of the shift cable 21 is secured in a bifurcated member 24 welded or otherwise suitably attached to the base 11 of the shifter 10. The shift lever arm 20 includes a cylindrical post 25 welded or otherwise suitably secured to the cable shifting arm 20 and the shift lever cable 21 includes an apertured lug 26 which is mounted on post 25 in a fashion that permits relative rotational movement between the shift lever 20 and cable 21 to prevent bending and binding of the cable. Thus, as the shift lever 15 is manually pivoted, for example between the positions 30 and 31 illustrated in FIG. 1, the shift cable 21 is linearly displaced and that linear displacement is transmitted to the shifting linkage disposed on the transmission.

Detent means is provided for defining the angular orientations of the shift stick 15 which correspond to park, neutral, drive, second low range and first low range in the case of a conventional three speed automatic automotive transmission. The detent means comprises a spring biased manually actuated detent 35 disposed on the shift lever 15. The detent 35 is spring biased into engagement with an arcuate array of detent engaging means disposed on the member 36. The member 36 includes apertured flanges 37 and 38, best illustrated in FIG. 3, for bolting, welding or otherwise suitably securing the member 36 to the base 11 of the shifter 10. The detent 35 is manually actuable by a push button 40 disposed atop the shift lever 15. The top portion of the shift lever 15 is tubular and the detent 35 preferably is formed from the bottom portion of a rod 41 extending through the tubular top portion of shift lever 15. As best illustrated in FIG. 2, the rod 41 is provided with a lower end 42 having a J-shape, the detent 35 being formed thereon. The rod 41 is spring biased upwardly by tension mounted coil spring 44. This biases the detent 35, disposed on the J-shaped section 42 of the rod 41, upwardly into engagement with the arcuate array of detent engaging means disposed on the member 36. The arcuate array of detent engaging means disposed on the member 36 includes detents 51, 52, 53, 54 and 55 for defining a first low range, a second low range, drive, neutral and park positions, respectively, in the case of a conventional three speed automotive transmission. To translate or pivot the shift lever 15 between gear positions defined by the arcuate array of detent engaging means, the operator simply depresses the push button 40 disposed atop the shift lever 15 to translate the detent 35 downwardly out of engagement with the arcuate array of detent engaging means 51 through 55. The operator is then free to pivot the shift lever 15 to the desired gear position whereupon release of the push button 40 the detent 35 engages the appropriate detent engaging means on arcuate member 36.

The flanges 56 and 57 disposed on the base 11 of the shifter 10 are provided for mounting a combination neutral park start and backup lamp switch. The posts 58 disposed on the shift lever 15 for pivotal movement therewith are provided for actuating a suitable gear position indicator.

The shifter 10 includes a park lock subassembly generally indicated by the numeral 60. The park lock subassembly comprises a park lock hook 61 pivotally mounted on the shift lever 15. As previously mentioned, it is to be understood that whenever the shift lever 15 is referred to, it is intended to include the pivotable carrier member 15' to which the tubular shift lever 15 is welded or otherwise suitably secured. Means for engaging the lock hook 61 is provided comprising an aperture 63 disposed in the base 11 of the shifter 10. When lock hook 61 is engaged by the aperture 63, pivotal movement of the shift lever 15 from the park position 30 is prevented. Means for spring biasing the pivotable lock hook 61 out of engagement with the aperture 63 is provided comprising a torsionally loaded coil spring 65, best illustrated in FIGS. 2 and 3. Means for connecting the lock hook 61 to an ignition switch locked park lock cable 67 is provided in the form of a post 70 and actuator arm 71 disposed on the lock hook. The park lock cable 67, illustrated in FIG. 3, is normally disposed along axis 68 in FIGS. 1 and 2. When the shift lever 15 is disposed in the park position 30 and the ignition switch is turned off, the ignition switch lock linkage associated with ignition switch 67' secures the park lock cable 67 in a stationary position such that when it is attempted to remove the shift lever 15 from the park position by pivoting of the shift lever 15 in the direction of the arrow 73, the park lock cable connected to actuator arm 71 pivots the lock hook 61 downwardly into engagement with the aperture 63 to prevent any significant translation or pivoting of the shift lever out of the park position.

Figure 1:
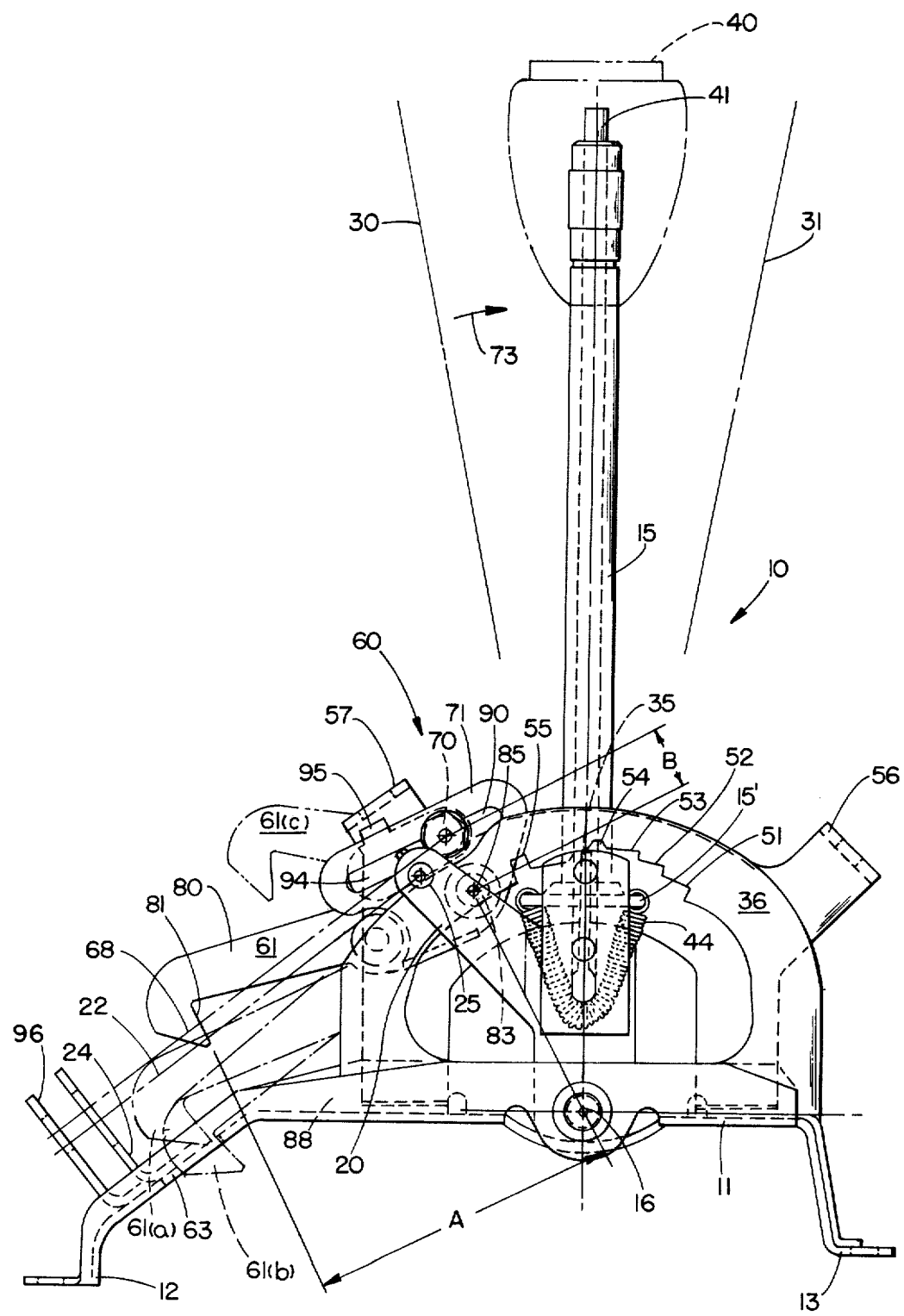
FIG. 1 is a side elevational view of a transmission shifter and park lock constructed according to the present invention.

With particular reference to FIG. 1, the operation of the park lock of the present invention is described in further detail. With the shift lever 15 disposed in the park position 30, the park lock hook 61 will be disposed in the position 61(a) illustrated in phantom in FIG. 1. With the shifter thus positioned in the park position, if the operator turns the ignition switch to the off position, the park lock cable 67 will be locked in place by the conventional lock linkage associated with the ignition switch. With the lock cable 67 so fixed, if the operator then attempts to pivot the shift lever 15 out of the park position in the direction of the arrow 73, the lock cable 67 connected to actuator arm 71 pivots the lock hook 61 downwardly to the position 61(b), illustrated in phantom in FIG. 1, into engagement with the aperture 63 in the base 11 of the shifter. Once the lock hook 61 is so engaged by the aperture 63, movement of the shift lever 15 to any other gear position is virtually impossible. This arrangement generates the principal park lock forces at the shifter through engagement of the lock hook 61 and the base 11 of the shifter. This advantageously eliminates loading of the ignition switch lock linkage and the lock cable 67 with the principal park lock forces. As a result, the park lock cable 67 (as illustrated in FIG. 3) may be much smaller, having a lower design load rating than the transmission shift cable 21, thus providing a substantial cost savings. In the past, when all of the park lock forces were generated by the ignition switch lock linkage, park lock cables of the same size as the shift cable 21 illustrated in FIG. 3 were provided. In the case of the park lock of the present invention, the park lock cable 67 may comprise a flexible shielded cable, known in the art as a Bowden cable, of sufficient strength to overcome the spring 65 normally biasing the lock hook 61 upwardly out of engagement with the aperture 63. The spring 65 need only have sufficient strength to overcome inertial and frictional forces generated in the park lock cable and ignition switch lock linkage when making a rapid gear change during the normal operation of the shifter. Thus, the cable 67 and for that matter, the ignition switch lock linkage, is subjected to substantially lower loads by the park lock of the present invention.

When the operator turns the ignition switch on again, the ignition switch lock linkage releases the park lock cable 67 so that the park lock cable 67 is again free to linearly translate with the pivotable shift lever 15. Since the spring 65 is provided with sufficient strength to overcome frictional and inertial forces in the ignition switch lock linkage and the park lock cable when the operator pivots the shift lever 15 out of the park position in the direction of the arrow 73, for example, to position 31 corresponding to the drive position, the lock hook 61 pivots along with the shift lever 15 upwardly out of engagement with the aperture 63 to the position 61(c), illustrated in phantom in FIG. 1.

As best illustrated in FIG. 2, a portion 62 of the lock hook 61 is generally U-shaped in cross section with the first and second generally parallel sections of the U-shaped cross section defining a hook arm 80 and the actuator arm 71, respectively. The hook arm 80 includes a hook means 81, best illustrated in FIG. 1. The actuator arm 71 includes the post 70 to which the park lock cable 67 is connected. The park lock hook 61 is journaled on a shaft 83 that extends through the hook arm 81 and the actuator arm 70. The park lock hook 71 is thus pivotally mounted to the shift lever 15 about axis 85. The torsionally loaded coil spring 65 which normally spring biases the park lock hook 61 upwardly, preferably surrounds the shaft 83 and is provided with first and second tails 86 and 87 engaging the hook arm 61 and shift lever 15, respectively. A stop pin 88 disposed on the lock hook 61 limits the upward travel of the spring biased lock hook.

An important aspect of the design of the park lock of the present invention is related to the fact that the hook arm 80 and the actuator arm 71 are provided with orthogonal components A and B measured from the hook means 81 and the connecting post 70, respectively, to the pivot axis 85 of the lock hook. According to the present invention, the lock hook is preferably provided with a ratio of A/B that is greater than 1 and preferably much greater than 1 whereby relatively small displacements of the shift lever are sufficient to pivot the lock means 81 downward into engagement with the aperture 63. As illustrated in FIG. 1, in a typical application, the ratio of A/B is approximately 5. This ratio of A/B effectively multiplies the displacement of the shift lever 15 insuring rapid and positive engagement of the hook means 81 and the aperture 63. This, in combination with the fact that the aperture 63 is disposed below the hook arm 61, in the base of the shifter, contributes greatly to the ease of assembly (manufacturing tolerences are not critical) and superiority of operation of the park lock of the present invention. The downwardly located engagement aperture 63 is significant in that if the park lock hook were reversed, and the engagement means disposed above the park lock hook, upon pivoting the shifter to gear positions other than the park position, a clearance problem would exist between the park lock hook and the engagement means.

It is to be understood that the park lock hook 61 may take many forms and rather than having the U-shaped structure disclosed herein, may comprise a simple bell crank or pivotable arm including hook means and means for connecting a park lock cable thereto. However, preferably the park lock hook 61 of the present invention includes a means for connecting the park lock cable 67 to the actuator arm 71 that is adjustable. The means for adjusting is used to compensate for dimensional irregularities or free play in the ignition switch lock linkage and the park lock cable. Preferably, the means for adjusting comprises a slot 90 disposed in the actuator arm 71 of the lock hook 61. The post 70 to which the park lock cable 67 is attached is disposed in the slot 90 in sliding engagement therewith. To accomplish sliding engagement of the post 70, the post 70 is provided with a shoulder 91 and a threaded end 92. The threaded end 92 is inserted through the slot 90 and a nut 93 is threadably received thereon for clamping the actuator arm 71 between the shoulder 91 and the nut 93. Also clamped between the shoulder 91 and the nut 93 is a guide plate 94 including a tab 95 engaging the top surface of the actuator arm 71. When the park lock of the present invention is assembled on an automotive vehicle, the park lock cable 67 is mounted in bifurcated member 96 and an apertured lug 97 on the park lock cable, similar to that used on the shift cable 21, is attached to the post 70. The apertured lug 97 is free to rotate about the post 70 so that pivotal motion of the shift lever 15 and/or the pivotal park lock hook 61 is not transmitted to the park lock cable 67. Thus, any pivotal motion of the shift lever 15 translates the park lock cable 67 without bending or binding the same. Once the park lock cable is attached to the post 70, all slack or free play in the ignition switch lock linkage and the park lock cable may be removed by linearly translating the post 70 in the slot 90 disposed in actuator arm 71. Once all free play has been removed from the linkage and park lock cable, the nut 93 is tightened securely clamping the post 70 at any predetermined position in the slot 90 on actuator arm 71. It should be noted that the apertured lugs 26 and 97 disposed on the shift cable 21 and park lock cable 67, respectively, may be secured to the posts 25 and 70, respectively, such that the lugs are pivotable therearound in any one of a variety of suitable manners such as by a washer and cotter key or a washer and split ring retainer. These elements are not illustrated herein.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. An automotive transmission shifter and park lock comprising:
   a base adapted for mounting in an automotive vehicle;
   a shift lever translatable with respect to said base;
   a park lock hook pivotably mounted on said shift lever;
   means for engaging said lock hook and thus preventing translation of said shift lever out of the park position;
   means for spring biasing said pivotable lock hook out of engagement with said means for engaging; and means for connecting said lock hook to an ignition switch locked park lock member, whereby once the park lock member is locked stationary said lock hook is pivoted into engagement with said means for engaging by translation of said shift lever out of the park position.

2. The shifter and park lock of claim 1 wherein said lock hook is connected to an ignition switch locked park lock cable and said means for spring biasing is provided with sufficient strength to overcome inertial and frictional forces generated by the cable and ignition switch linkage when making a rapid gear change during the normal operation of the shifter.

3. The shifter and park lock of claim 1 wherein said means for engaging said lock hook is disposed on said base below said lock hook, said lock hook being spring biased upwardly out of engagement with said means for engaging.

4. The shifter and park lock of claim 3 wherein said means for engaging said lock hook comprises a aperture disposed in said base.

5. The shifter and park lock of claim 1 wherein said lock hook comprises a pivotable arm including a hook means and said means for connecting, said pivotable arm including orthogonal components A and B measured from said hook means and said means for connecting, respectively, to the pivot point of said pivotable arm, said pivotable arm being provided with a ratio A/B greater than 1, whereby small displacements of said shift lever are sufficient to pivot said lock hook into engagement with said means for engaging.

6. The shifter and park lock of claim 5 wherein said A/B ratio is approximately 5.

7. The shifter and park lock of claim 1 wherein said means for connecting includes means for adjusting to compensate for irregularities in the ignition switch linkage and the ignition switch locked park lock member.

8. The shifter and park lock of claim 7 wherein said means for adjusting comprises a slot disposed in said lock hook, a post adapted for sliding engagement with said slot and means for clamping said post in said slot, said park lock member being connected to said post and said post being translatable in said slot to remove free play in the ignition switch linkage and the ignition switch locked park lock member.

9. The shifter and park lock of claim 1 wherein a portion of said lock hook is generally U-shaped in cross section, first and second parallel sections of said U-shaped cross section defining a hook arm and a hook actuator arm, respectively, said hook arm including a hook means and said actuator arm including said means for connecting.

10. The shifter and park lock of claim 9 wherein said lock hook is journaled on a shaft extending through said hook arm and said actuator arm and secured to said shift lever.

11. The shifter and park lock of claim 10 wherein said means for spring biasing comprises a torsionally loaded coil spring disposed about said shaft, a first tail of said coil spring engaging said lock hook and a second tail of said coil spring engaging said shift lever.

12. The shifter and park lock of claim 9 wherein said hook arm and said actuator arm include orthogonal components A and B measured from said hook means and said means for connecting, respectively, to the pivot point of said lock hook, said lock hook being provided with a ratio A/B greater than 1, whereby small displacements of said shift lever are sufficient to pivot said lock hook into engagement with said means for engaging.

13. The shifter and park lock of claim 12 wherein said means for engaging comprises an aperture disposed in said base below said lock hook, and said lock hook is biased upwardly out of engagement with said aperture by said means for spring biasing.

14. An automotive automatic transmission shifter and park lock comprising:
a base adapted for mounting in an automotive vehicle;
a shift lever pivotable about said base;
means for connecting said shift lever to a transmission shift cable;
an arcuate array of detent engaging means disposed on said base;
a spring based manually actuated detent disposed on said shift lever, said detent being spring biased into engagement with said arcuate array of detent engaging means, said detent engaging means thereby defining transmission gear shift positions;
a park lock hook pivotally mounted on said shift lever;
means for engaging said lock hook and thus preventing pivoting of said shift lever out of the park position, said means for engaging being disposed on said base;
means for spring biasing said pivotable lock hook out of engagement with said means for engaging; and
means for connecting said lock hook to an ignition switch locked park lock cable, whereby once the park lock cable is locked stationary said lock hook is pivoted into engagement with said means for engaging by pivoting of said shift lever out of the park position.

15. The shifter and park lock of claim 14 wherein said means for spring biasing is provided with sufficient strength to overcome inertial and frictional forces generated by the cable and ignition switch linkage when making a rapid gear change during the normal operation of the shifter.

16. The shifter and park lock of claim 14 wherein said means for engaging said lock hook is disposed on said base below said lock hook, said lock hook being spring biased upwardly out of engagement with said means for engaging.

17. The shifter and park lock of claim 16 wherein said means for engaging said lock hook comprises a aperture disposed in said base.

18. The shifter and park lock of claim 14 wherein said lock hook comprises a pivotable arm including a hook means and said means for connecting, said pivotable arm including orthogonal components A and B measured from said hook means and said means for connecting, respectively, to the pivot point of said pivotable arm, said pivotable arm being provided with a ratio A/B greater than 1, whereby small displacements of said shift lever are sufficient to pivot said lock hook into engagement with said means for engaging.

19. The shifter and park lock of claim 18 wherein said A/B ratio is approximately 5.

20. The shifter and park lock of claim 14 wherein said means for connecting includes means for adjusting to compensate for irregularities in the ignition switch linkage and the ignition switch locked park lock cable.

21. The shifter and park lock of claim 20 wherein said means for adjusting comprises a slot disposed in said lock hook, a post adapted for sliding engagement with said slot and means for clamping said post in said slot, said park lock cable being connected to said post and said post being translatable in said slot to remove free play in the ignition switch linkage and the ignition switch locked park lock cable.

22. The shifter and park lock of claim 14 wherein a portion of said lock hook is generally U-shaped in cross section first and second parallel sections of said U-shaped cross section defining a hook arm and a hook actuator arm, respectively, said hook arm including a hook means and said actuator arm including said means for connecting.

23. The shifter and park lock of claim 22 wherein said lock hook is journaled on a shaft extending through said hook arm and said actuator arm and secured to said shift lever.

24. The shifter and park lock of claim 23 wherein said means for spring biasing comprises a torsionally loaded coil spring disposed about said shaft, a first tail of said coil spring engaging said lock hook and a second tail of said coil spring engaging said shift lever.

25. The shifter and park lock of claim 23 wherein said hook arm and said actuator arm include orthogonal components A and B measured from said hook means and said means for connecting, respectively, to the pivot point of said lock hook, said lock hook being provided with a ratio A/B greater than 1, whereby small displacements of said shift lever are sufficient to pivot said lock hook into engagement with said means for engaging.

26. The shifter and park lock of claim 25 wherein said means for engaging comprises an aperture disposed in said base below said lock hook, and said lock hook is biased upwardly out of engagement with said aperture by said means for spring biasing.

27. The shifter and park lock of claim 14 wherein said detent is manually actuable by a push button disposed atop said shift lever.

28. The shifter and park lock of claim 27 wherein said shift lever is tubular and said detent comprises a rod extending through said shift lever.

29. The shifter and park lock of claim 28 wherein said rod is provided with a J-shaped end for engaging said detent engaging means, said rod being spring biased upward into engagement with said detent engaging means.

30. An automotive transmission shifter and park lock comprising:

a base adapted for mounting in an automotive vehicle;
a shift lever translatable with respect to said base;
park lock means for defining a stop when actuated which limits translation of said shift lever relative to said base to prevent removal of said shift lever from the park position, said park lock means being disposed on said shift lever in said transmission shifter so that all significant park lock forces are generated in said transmission shifter;
means for actuating said park lock means when the vehicle engine is turned off; and
said park lock means comprising a pivotable stop member, said stop member being pivotable in a first direction into engagement with said base to limit translation of said shift lever relative to said base and said stop member being pivotable in a second direction to permit translation of said shift lever relative to said base.

31. The automotive transmission shifter of claim 30 further including means for spring biasing said pivotable stop member in said second direction to permit translation of said shift lever relative to said base.

32. The automotive transmission shifter of claim 31 wherein said means for actuating said park lock means comprises a park lock cable.

33. The automotive transmission shifter of claim 32 wherein said park lock cable is locked stationary when the vehicle engine is turned off.

34. The automotive transmission shifter of claim 33 wherein said park lock cable is connected to said pivotable stop member in a manner such that when said park lock cable is locked stationary translation of said shift lever out of the park position pivots said stop member in said first direction into engagement with said base to limit translation of said shift lever relative to said base.

35. The automotive transmission shifter of claim 34 wherein said pivotable stop member comprises a pivotable hook for selectively engaging said base.

36. The automotive transmission shifter of claim 34 wherein said pivotable stop member comprises a pivotable arm including base engaging means and means for connecting said park lock cable, said pivotable arm including orthogonal components A and B measured from said base engaging means and said means for connecting, respectively, to the pivot point of said pivotable arm, said pivotable arm being provided with a ratio A/B greater than 1 whereby smaller displacements of said shift lever are sufficient to pivot said base engaging means into engagement with said base.

* * * * *